UNITED STATES PATENT OFFICE.

JOHN F. GREENE, OF BROOKLYN, NEW YORK.

IMPROVEMENT IN FELTING MATERIALS OBTAINED FROM WASTE FELTED FABRICS.

Specification forming part of Letters Patent No. 23,642, dated April 12, 1859; reissue No. 2,086, dated October 10, 1865; extended seven years; reissue No. 5,764, dated February 10, 1874; application filed July 8, 1873.

CASE B.

*To all whom it may concern:*

Be it known that I, JOHN F. GREENE, of Brooklyn, county of Kings and State of New York, have invented an Improved Felting Material and Fabric, of which the following is a specification:

My improved felting material consists of filaments or fibers of wool or hair, split or broken, as described hereafter, and peculiarly adapted from their form to be employed in the manufacture of fine felt fabrics.

These filaments are produced by disintegrating felt fabrics, a means being thus afforded of rendering available what was formerly waste clippings produced in the manufacture of hats, &c., as well as of utilizing old, worn, and otherwise valueless felts.

If the felts to be disintegrated have been coated or stiffened with shellac, mastic, or glue, the latter, before the new fiber can be formed, must be removed, which is done by steeping the felt in a solution that will extract the sizing. The felts are then washed and dried. All cement having been removed, the felts are steamed until the filaments are softened, and while in this state are subjected to the action of such picking mechanism as will disintegrate the fabric and divide or split the fibers.

The process may be varied, and any suitable mechanism may be employed; but I prefer to use the process and apparatus described in Letters Patent granted to me, and bearing even date herewith.

It has been demonstrated that short fibers, useless for felting purposes, are converted into a valuable merchantable article when split or divided, as above described, and that, when such fibers are combined with ordinary felting material, the felts produced therefrom are superior in quality to those made of new fur alone.

I claim—

As a new article of manufacture, a felting material consisting of fibers of fur or wool split or divided, as set forth.

In testimony whereof I have signed my name to this specification in the presence of two subscribing witnesses.

JOHN F. GREENE.

Witnesses:

GEO. F. SEYMOUR,

REON BARNES.